(No Model.) 2 Sheets—Sheet 1.

D. JOY.
VALVE GEAR FOR ENGINES.

No. 506,509. Patented Oct. 10, 1893.

Witnesses.
Albert Popkins.
Jas. L. Skidmore.

Inventor.
David Joy
by his attorneys
Howson & Howson (No Model.)

2 Sheets—Sheet 2.

D. JOY.
VALVE GEAR FOR ENGINES.

No. 506,509.

Patented Oct. 10, 1893.

WITNESSES:
George Baumann
Albert Popkins

INVENTOR
David Joy
BY
Howson and Howson
his ATTORNEYS.

UNITED STATES PATENT OFFICE.

DAVID JOY, OF LONDON, ENGLAND.

VALVE-GEAR FOR ENGINES.

SPECIFICATION forming part of Letters Patent No. 506,509, dated October 10, 1893.

Application filed March 5, 1892. Serial No. 423,847. (No model.) Patented in England December 13, 1887, No. 17,168; in France October 30, 1888, No. 193,815, and in Italy October 25, 1892, No. 418.

*To all whom it may concern:*

Be it known that I, DAVID JOY, a subject of the Queen of Great Britain and Ireland, residing at 17 Victoria Street, in the city of Westminster, London, England, have invented certain Improvements in Valve-Gear for Engines, (for which I have obtained Letters Patent in Great Britain, No. 17,168, dated December 13, 1887; in France, No. 193,815, dated October 30, 1888, and in Italy, No. 418, dated October 25, 1892,) of which the following is a specification.

My invention has reference to steam or other motive power engines, actuated by fluid pressure in which the valves of such engines are given a part of their motion from some moving part of the engine itself the remaining part of the motion of the said valves being imparted by fluid pressure which may be that of the fluid actuating the engine itself or fluid pressure otherwise derived, such as described in Letters Patent granted to me in Great Britain, No. 2,000, dated July 11, 1886.

My present invention relates to an improvement in the small cylinder and piston referred to in said patent.

Figure 1:
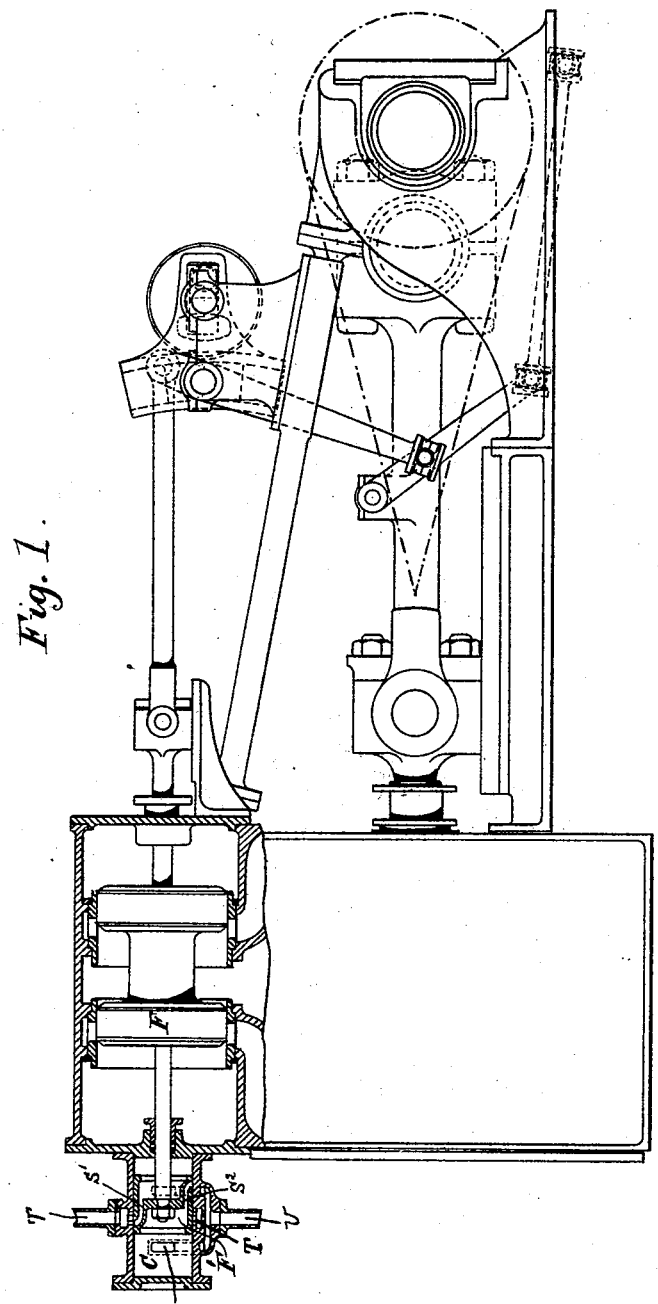
Figure 2:
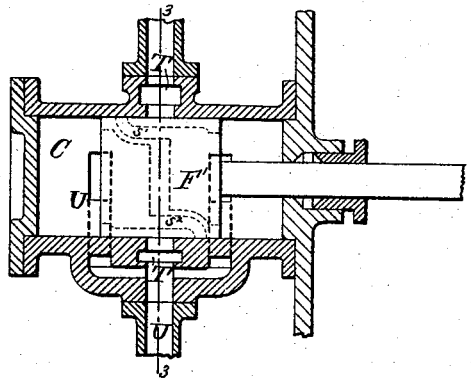
Figure 3:
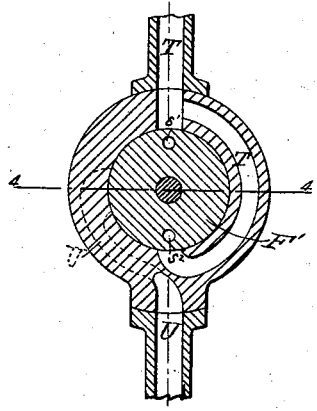
Figure 4:
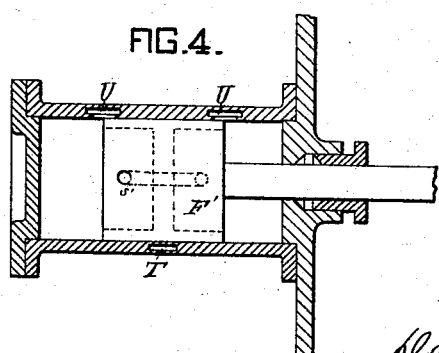

In the accompanying drawings, Figure 1 illustrates an engine in which the mechanical valve gear is assisted by a small steam cylinder and piston therefor according to my present invention. Figs. 2, 3 and 4 are enlarged views of the small cylinder and piston, Fig. 2 being a longitudinal section on line 2—2 of Fig. 3, Fig. 3 a transverse section on line 3—3 of Fig. 2, and Fig. 4 a section on line 4—4 of Fig. 3.

In Fig. 1, I have shown an ordinary engine fitted with a complete valve gear, which need not be however necessarily of the type shown, but may be link or any other gear. This illustrates a mechanical gear assisted by a steam cylinder. To the valve spindle of the main valve F I attach the piston F' of the small cylinder C; this cylinder has no valve but the piston is provided with suitable ports in itself and so becomes a valve; these ports correspond with other ports in the cylinder by the proper adjustment of which relating to each other steam is admitted to and exhausted from the cylinder C making it an assistant power to aid the main valve motion, and relieve its strains. It will cushion up the momentum of the weight of the main valve and its adjuncts. Figs. 2, 3 and 4 show this more particularly. $s'$ and $s^2$ are ports in the piston F' the said ports passing forward and backward respectively and opening out at each side of the piston as shown clearly in Fig. 1. They pass over and cover and uncover alternately the steam ports T and the exhaust port U formed in the side of the cylinder and thus an automatic reciprocating motion is added to and is in unison with the motion already imparted by the existing valve motion of the engine, and this takes up all shocks due to the momentum of the parts and acts as a storage of force to initiate the return movements.

I claim as my invention—

In motive power engines, the combination of the main valve of the motive cylinder with a cylinder C, having steam inlet and exhaust ports, and a piston for the cylinder C, provided with ports adapted to connect the ends of the cylinder with the said steam inlet and exhaust alternately, substantially as and for the purposes set forth.

In testimony whereof I have signed my name to this specification in the presence of two subscribing witnesses.

DAVID JOY.

Witnesses:
H. D. HOSKINS,
9 *Birchin Lane, London, E. C.*
J. M. SMITH,
60 *Ashley Rd., Crouch Hill, London, N.*